United States Patent
Wang et al.

(10) Patent No.: US 10,288,232 B2
(45) Date of Patent: May 14, 2019

(54) BACKLIGHT MODULE, METHOD FOR OPERATING THE SAME AND DISPLAY DEVICE

(71) Applicant: BOE TECHNOLOGY GROUP CO., LTD., Beijing (CN)

(72) Inventors: Xin Wang, Beijing (CN); Jianhua Du, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/737,532

(22) PCT Filed: May 24, 2017

(86) PCT No.: PCT/CN2017/085692
§ 371 (c)(1),
(2) Date: Dec. 18, 2017

(87) PCT Pub. No.: WO2018/001006
PCT Pub. Date: Jan. 4, 2018

(65) Prior Publication Data
US 2018/0252370 A1    Sep. 6, 2018

(30) Foreign Application Priority Data

Jun. 30, 2016    (CN) .......................... 2016 1 0509719

(51) Int. Cl.
*G02B 5/02*    (2006.01)
*F21K 9/61*    (2016.01)
(Continued)

(52) U.S. Cl.
CPC ................ *F21K 9/61* (2016.08); *G02B 6/005* (2013.01); *G02B 6/0025* (2013.01);
(Continued)

(58) Field of Classification Search
CPC ..... F21K 9/61; G02B 6/0025; G02B 27/0955; G02B 27/30; G02B 6/005; G02B 6/0043;
(Continued)

(56) References Cited

U.S. PATENT DOCUMENTS

2005/0083571 A1* 4/2005 Shimizu ............... G02B 3/0012
359/456
2006/0227546 A1* 10/2006 Yeo ...................... G02B 5/0242
362/227
(Continued)

FOREIGN PATENT DOCUMENTS

CN    103591514 A    2/2014
CN    203551920 U    4/2014
(Continued)

OTHER PUBLICATIONS

International Search Report dated Sep. 5, 2017 corresponding to application No. PCT/CN2017/085692.
(Continued)

*Primary Examiner* — Anh T Mai
*Assistant Examiner* — Fatima N Farokhrooz
(74) *Attorney, Agent, or Firm* — Nath, Goldberg & Meyer; Joshua B. Goldberg

(57) ABSTRACT

The present disclosure provides a backlight module, a method for operating the same and a display device including the backlight module. The backlight module comprises a light guide plate, a collimated light source and a shading plate between the light guide plate and the collimated light source. The light guide plate comprises a transparent main body and a plurality of diffusion dots formed on the transparent main body. The shading plate comprises a plurality of shading regions corresponding to the plurality of diffusion
(Continued)

dots of the light guide plate. The collimated light source generates collimated light vertically irradiating on the shading plate.

18 Claims, 3 Drawing Sheets

(51) Int. Cl.
*G02F 1/1335* (2006.01)
*F21V 8/00* (2006.01)
*G02B 27/09* (2006.01)
*F21Y 115/10* (2016.01)
*G02B 27/30* (2006.01)
*G02B 5/20* (2006.01)

(52) U.S. Cl.
CPC ....... *G02B 27/0955* (2013.01); *G02F 1/1335* (2013.01); *F21Y 2115/10* (2016.08); *G02B 5/0215* (2013.01); *G02B 5/201* (2013.01); *G02B 6/0043* (2013.01); *G02B 27/30* (2013.01)

(58) Field of Classification Search
CPC ...... G02B 5/201; G02B 5/0215; G02B 5/003; F21Y 2115/10; G02F 1/1335
See application file for complete search history.

(56) References Cited

U.S. PATENT DOCUMENTS

| 2008/0291359 | A1* | 11/2008 | Miyashita | ............ | G02B 3/0056 |
| | | | | | 349/61 |
| 2009/0310064 | A1 | 12/2009 | Choe et al. | | |
| 2011/0317261 | A1* | 12/2011 | Minami | ............... | G02B 5/0215 |
| | | | | | 359/462 |
| 2014/0111862 | A1* | 4/2014 | Yamamoto | ........ | G02F 1/133504 |
| | | | | | 359/599 |
| 2016/0139454 | A1* | 5/2016 | Katsuta | ................ | G02B 5/0242 |
| | | | | | 359/599 |

FOREIGN PATENT DOCUMENTS

| CN | 105911636 | A | | 8/2016 |
| CN | 205749977 | U | | 11/2016 |
| JP | 2008310271 | A | | 12/2008 |
| JP | 201128019 | A | | 2/2011 |
| JP | 2011028019 | | * | 2/2011 |

OTHER PUBLICATIONS

Chinese First Office Action dated Sep. 27, 2017 corresponding to application No. 201610509719.7.

* cited by examiner

BACKLIGHT MODULE, METHOD FOR OPERATING THE SAME AND DISPLAY DEVICE

This is a National Phase Application filed under 35 U.S.C. 371 as a national stage of PCT/CN 2017/085692, filed May 24, 2017, an application claiming the benefit of Chinese Application No. 201610509719.7, filed Jun. 30, 2016, the content of each of which is hereby incorporated by reference in its entirety.

TECHNICAL FIELD

The present application relates to the field of display technology, and in particular relates to a backlight module, a method for operating the same and a display device including the backlight module.

BACKGROUND

Portable electronic products having display devices have been widely applied, for example, while people are riding a transportation means, they can read, study or communicate through their own mobile phones or tablet computers or the like. However, contents displayed on their own mobile phones or tablet computers or the like may be peeped at by people around, resulting in leakage of information such as personal privacy, and bringing inconvenience to the users.

In the prior art, displayed information is protected from leakage by attaching an anti-peep film on an upper surface of a display device. However, the approach of preventing leakage of information by attaching an anti-peep film is not very flexible. When there is no risk of information leakage and a user desires to view a display device in a normal mode, the anti-peep film needs to be taken off, and the next time when prevention from information leakage is required, the anti-peep film needs to be attached again.

SUMMARY

How to provide a method capable of conveniently switching between a normal display mode and an anti-peep mode is an urgent problem to be solved in the art.

The present disclosure is intended to address at least the above-described problem existing in the prior art, and provides a backlight module, a method for operating the same and a display device including the backlight module.

According to an aspect of the present disclosure, there is provided a backlight module, including a light guide plate, a collimated light source and a shading plate between the light guide plate and the collimated light source. The light guide plate comprises a transparent main body and a plurality of diffusion dots formed on the transparent main body. The shading plate comprises a plurality of shading regions corresponding to the plurality of diffusion dots of the light guide plate. The collimated light source generates collimated light vertically irradiating on the shading plate.

According to an embodiment of the present disclosure, the backlight module may further include a driving unit connected to at least one of the shading plate and the light guide plate, and configured to drive the at least one of the shading plate and the light guide plate to move, such that a relative displacement is produced between the shading plate and the light guide plate in a plane of the backlight module.

According to an embodiment of the present disclosure, the shading plate may include: a transparent substrate; and a plurality of shading patterns on the transparent substrate that form the plurality of shading regions.

According to an embodiment of the present disclosure, a material of the shading pattern may be metal.

According to an embodiment of the present disclosure, a material of the shading pattern may be glass.

According to an embodiment of the present disclosure, the light guide plate may include collimated light exiting regions between adjacent diffusion dots, and a size of the collimated light exiting region may be equal to a size of the shading region of the shading plate.

According to an embodiment of the present disclosure, the collimated light source may include at least one of a laser and a LED lamp with a collimating lens.

According to an embodiment of the present disclosure, a material of the transparent main body of the light guide plate may be one of polycarbonate, polymethyl methacrylate and glass.

According to another aspect of the present disclosure, there is provided a display device including the backlight module according to the present disclose.

According to still another aspect of the present disclosure, there is provided a method for operating a backlight module, the backlight module including a light guide plate, a collimated light source and a shading plate between the light guide plate and the collimated light source, the light guide plate including a transparent main body and a plurality of diffusion dots formed on the transparent main body, the shading plate comprising a plurality of shading regions corresponding to the plurality of diffusion dots of the light guide plate, and the collimated light source generating collimated light vertically irradiating on the shading plate. The method includes: in an anti-peep display mode, aligning the shading regions of the shading plate with the diffusion dots of the light guide plate in a direction perpendicular to a plane of the backlight module; and in a normal display mode, staggering the shading regions of the shading plate with the diffusion dots of the light guide plate in the direction perpendicular to the plane of the backlight module.

According to an embodiment of the present disclosure, the backlight module may further include a driving unit connected to at least one of the shading plate and the light guide plate. The method may further include: in the anti-peep display mode, driving, by the driving unit, the at least one of the shading plate and the light guide plate to move such that the shading regions of the shading plate are aligned with the diffusion dots of the light guide plate in the direction perpendicular to the plane of the backlight module; and in the normal display mode, driving, by the driving unit, the at least one of the shading plate and the light guide plate to move such that the shading regions of the shading plate are staggered with the diffusion dots of the light guide plate in the direction perpendicular to the plane of the backlight module.

According to the technical solutions of the present disclosure, a user can adjust relative position between the shading plate and the light guide plate as practically required, such that the shading regions of the shading plate are either aligned or staggered with the diffusion dots of the light guide plate to realize an anti-peep display mode and a normal display mode, respectively, and further to conveniently switch between the anti-peep display mode and the normal display mode.

BRIEF DESCRIPTION OF THE FIGURES

The accompanying drawings, constituting a part of the description, are provided for a further understanding of the present disclosure, and, are intended for interpretation rather than limitation of the present disclosure together with the following specific implementations, in which.

DETAILED DESCRIPTION

In order to enable a person skilled in the art to better understand the technical solution of the present disclosure, a backlight module, an operation method thereof and a display device including the backlight module according to embodiments of the present disclosure are described in detail below in conjunction with the accompanying drawings.

Figure 1:
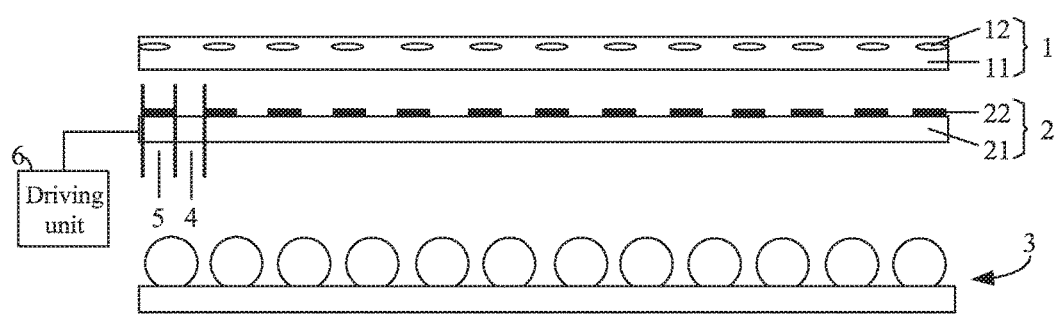
FIG. 1 schematically shows a structure of a backlight module according to an embodiment of the present disclosure.
Figure 2:
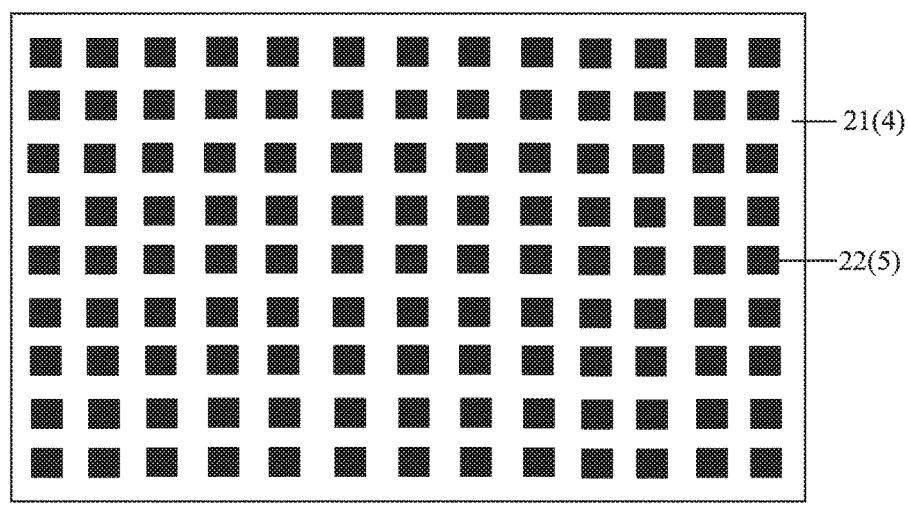
FIG. 2 is a plan view of a shading plate in FIG. 1.

FIG. 1 schematically shows a structure of a backlight module according to an embodiment of the present disclosure, and FIG. 2 is a plan view of a shading plate in FIG. 1.

Referring to FIG. 1, a backlight module according to an embodiment of the present disclosure may include a light guide plate 1, a shading plate 2 and a collimated light source 3. The shading plate 2 is located between the light guide plate 1 and the collimated light source 3. The light guide plate 1 may include a transparent main body 11 and a plurality of diffusion dots 12 formed on the transparent main body 11. The shading plate 2 includes a plurality of shading regions 5 corresponding to the plurality of diffusion dots 12 of the light guide plate 1. The collimated light source 3 generates collimated light perpendicularly irradiating on the shading plate 2.

As shown in FIG. 2, light transmitting regions 4 may be formed in regions of the shading plate 2 other than the shading regions 5, such that the collimated light generated by the collimated light source 3 can vertically irradiate onto the light guide plate 1 through the light transmitting regions 4.

According to an embodiment of the present disclosure, the collimated light source 3 may include various light sources capable of generating collimated light such as a laser, a LED lamp with a collimating lens, etc.

According to the backlight module of the present disclosure, a user can adjust relative position between the shading plate 2 and the light guide plate 1 as practically required, such that the shading regions 5 of the shading plate 2 are either aligned or staggered with the diffusion dots 12 of the light guide plate 1 to realize an anti-peep display mode or a normal display mode, and further to conveniently switch between the anti-peep display mode and the normal display mode.

In order to enable a person skilled in the art to better understand the present disclosure, specific operation processes of the backlight module provided in the present embodiment in the anti-peep display mode and the normal display mode will be described in detail below.

Figure 3A:
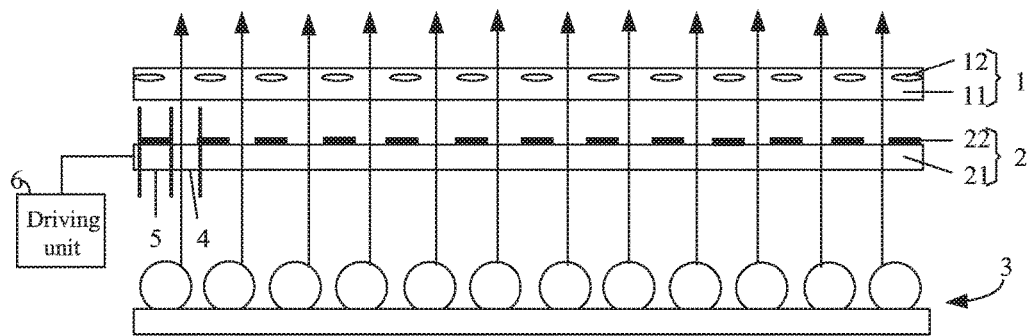
FIG. 3A is a schematic diagram of a structure of the backlight module of FIG. 1 in an anti-peep mode.

FIG. 3A is a schematic diagram of a structure of the backlight module of FIG. 1 in an anti-peep mode.

Referring to FIG. 3A, in the anti-peep display mode, a user can adjust a position of the shading plate 2 and/or a position of the light guide plate 1 within a plane of the backlight module (a plane perpendicular to the collimated light), such that the shading regions 5 of the shading plate 2 are aligned with the diffusion dots 12 of the light guide plate 1. In this case, the collimated light generated by the collimated light source 3 vertically irradiating on the shading plate 2 is blocked by the shading regions 5 of the shading plate 2, so that there is no light irradiating onto the diffusion dots 12 of the light guide plate 1. In addition, the collimated light passing through the light transmitting regions 4 of the shading plate 2 vertically irradiates on the light guide plate 1 and passes through regions between the diffusion dots 12 to be emitted out vertically. Therefore, the regions of the light guide plate 1 located between the diffusion dots 12 may be referred to as collimated light exiting regions. In this case, the user can see displayed contents only in a direction perpendicular to the plane of the backlight module, so as to achieve an effect of anti-peep display.

Figure 3B:
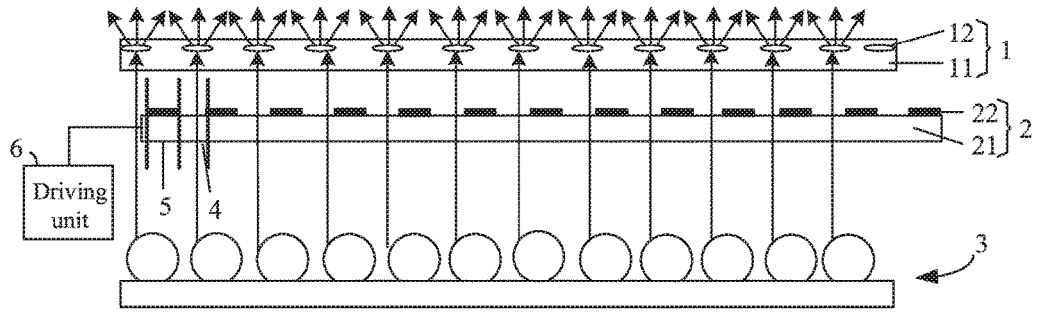
FIG. 3B is a schematic diagram of a structure of the backlight module of FIG. 1 in a normal display mode.

FIG. 3B is a schematic diagram of a structure of the backlight module of FIG. 1 in a normal display mode.

Referring to FIG. 3B, in the normal display mode, a user can adjust the position of the shading plate 2 and/or the position of the light guide plate 1 within the plane of the backlight module, such that the shading regions 5 of the shading plate 2 are staggered with the diffusion dots 12 of the light guide plate 1. In this case, the collimated light generated by the collimated light source 3 vertically irradiating on the shading plate 2 passes through the light transmitting regions 4 of the shading plate 2 and irradiates onto the diffusion dots 12. Due to the diffusing effect of the diffusion dots 12, the collimated light generated by the collimated light source 3 is diffused, so that the backlight module forms a surface light source. In this case, the user can see displayed contents in multiple directions.

According to an embodiment of the present disclosure, a material of the transparent main body 11 of the light guide plate 1 may be one of polycarbonate, polymethyl methacrylate and glass. The diffusion dots 12 may be formed on the transparent main body 11 by a method such as printing method, chemical etching method, V-cut method, stamper method, internal diffusion method, etc.

Referring to FIGS. 1, 2, 3A and 3B, the shading plate 2 may include a transparent substrate 21, and shading patterns 22 on the transparent substrate 21 that form the shading regions 5. Regions of the transparent substrate 21 in which the shading patterns 22 are not formed may form the light transmitting regions 4. The shading patterns 22 may be formed on the transparent substrate 21 by a method such as printing, mask patterning or the like.

According to an embodiment of the present disclosure, a material of the transparent substrate 21 may be glass, and a material of the shading patterns 22 may be metal material, and the shading patterns 22 may be formed by a mask patterning process.

It should be noted that the shading patterns 22 shown in the figures are located at a side of the transparent substrate 21 facing the light guide plate 1, but the present disclosure is not limited thereto. According to an embodiment of the present disclosure, the shading patterns 22 can be located at a side of the transparent substrate 21 away from the light guide plate 1, or inside the transparent substrate 21. According to an embodiment of the present disclosure, the shading patterns 22 may be located on both sides of the transparent substrate 21 (i.e., a side facing the light guide plate 1 and a side away from the light guide plate 1), thereby reducing a density of the shading patterns formed on a single side of the transparent substrate 21, so as to reduce process cost. In addition, the shading patterns 22 shown in the figures are formed to have a rectangular shape, but the present disclosure is not limited thereto. It should be appreciated by a person skilled in the art that the shading patterns 22 of any shape can be applied to the present disclosure, as long as when the shading patterns 22 are aligned with the corresponding diffusion dots 12, the diffusion dots 12 can be completely shaded from the irradiation of the collimated light generated by the collimated light source 3.

According to an embodiment of the present disclosure, the backlight module may further include a driving unit 6. The driving unit 6 may be connected to at least one of the shading plate 2 and the light guide plate 1, to drive the shading plate 2 and/or the light guide plate 1 to move, such that a relative displacement is produced between the shading plate 2 and the light guide plate 1 in the plane of the backlight module, to realize the anti-peep display mode and the normal display mode of backlight module, and to switch between the two modes conveniently.

It should be noted that only a case where the driving unit 6 is connected to the shading plate 2 is illustratively shown in the figures, but the present disclosure is not limited thereto. According to an embodiment of the present disclosure, the driving unit 6 may be connected with the light guide plate 1, or the driving unit 6 may be connected with both the shading plate 2 and the light guide plate 1.

According to an embodiment of the present disclosure, a size of the shading regions 5 of the shading plate 2 may be set to be equal to a size of the collimated light exiting regions of the light guide plate 1, to ensure display effect of a display device in the normal display mode. When the shading regions 5 are staggered with the diffusion dots 12, the shading regions 5 may partially shade the collimated light exiting regions between the diffusion dots 12. By setting the size of the shading regions 5 to be equal to the size of the collimated light exiting regions, the diffusion dots 12 can diffuse as much light as possible, thereby ensuring the display effect in the normal display mode. For example, referring to FIG. 2, when the shading regions 5 (i.e., the shading patterns 22 as shown in FIG. 2) are caused to be staggered with the diffusion dots 12 by a movement in a horizontal direction, a length of the shading regions 5 in the horizontal direction may be set to be equal to a length of the collimated light exiting regions in the horizontal direction; when the shading regions 5 are caused to be staggered with the diffusion dots 12 by a movement in a vertical direction, a length of the shading regions 5 in the vertical direction may be set to be equal to a length of the collimated light exiting regions in the vertical direction; when the shading regions 5 are caused to be staggered with the diffusion dots 12 by a movement in both horizontal and vertical directions, the lengths of the shading regions 5 in the horizontal direction and the vertical direction may be set to be equal to the lengths of the collimated light exiting regions in the horizontal direction and the vertical direction, respectively.

Figure 4:
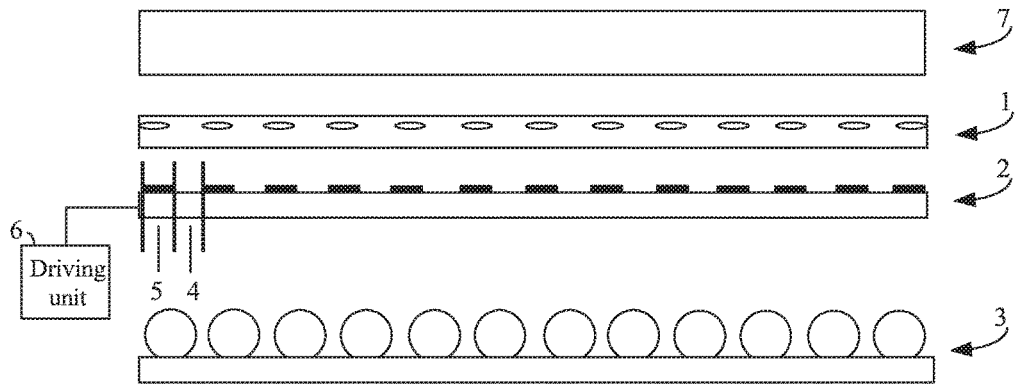
FIG. 4 schematically shows a structure of a display device according to an embodiment of the present disclosure.

FIG. 4 schematically shows a structure of a display device according to an embodiment of the present disclosure.

Referring to FIG. 4, the display device according to an embodiment of the present disclosure may include a display panel 7 and the backlight module as shown in FIG. 1.

Figure 5:
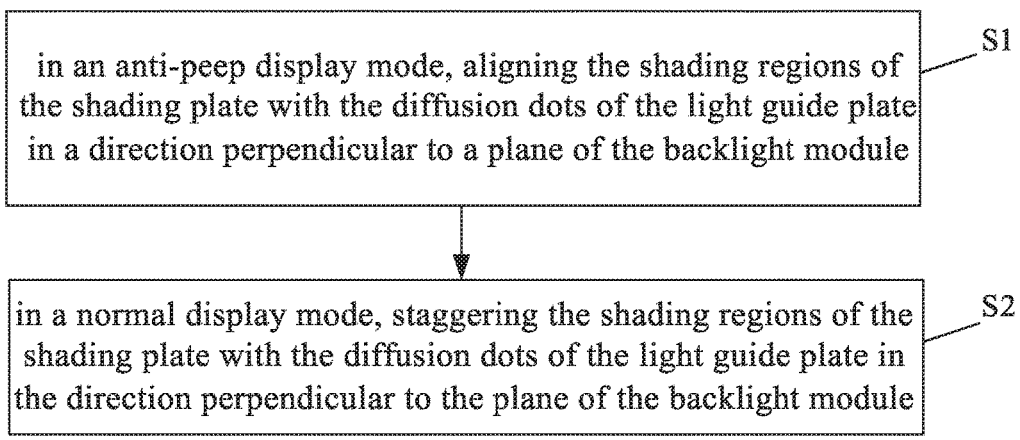
FIG. 5 is a flow chart of a method for operating a backlight module according to an embodiment of the present disclosure.

FIG. 5 is a flow chart of a method for operating a backlight module according to an embodiment of the present disclosure.

As shown in FIG. 5, the method for operating a backlight module according to an embodiment of the present disclosure may include:

in an anti-peep display mode, aligning shading regions of a shading plate with diffusion dots of a light guide plate in a direction perpendicular to a plane of the backlight module (S1); and in a normal display mode, staggering the shading regions of the shading plate with the diffusion dots of the light guide plate in the direction perpendicular to the plane of the backlight module (S2).

Referring to FIGS. 3A and 5, in the anti-peep display mode, collimated light generated by the collimated light source 3 vertically irradiates on the shading plate 2, and passes through the light transmitting regions 4 of the shading plate 2 and the collimated light exiting regions of the light guide plate 1 successively. Referring to FIGS. 3B and 5, in the normal display mode, collimated light generated by the collimated light source 3 vertically irradiates on the shading plate 2, and passes through the light transmitting regions 4 to irradiate onto the diffusion dots 12.

According to an embodiment of the present disclosure, when the backlight module includes a driving unit, the light guide plate and/or the shading plate may be caused to produce a relative displacement in the plane of the backlight module by the driving unit. That is, in the anti-peep display mode, at least one of the shading plate and the light guide plate is driven by the driving unit to move, such that the shading regions of the shading plate are aligned with the diffusion dots of the light guide plate in the direction perpendicular to the plane of the backlight module; and in the normal display mode, at least one of the shading plate and the light guide plate is driven by the driving unit to move, such that the shading regions of the shading plate are staggered with the diffusion dots of the light guide plate in the direction perpendicular to the plane of the backlight module.

It can be understood that the foregoing implementations are merely exemplary implementations used for describing the principle of the present invention, but the present invention is not limited thereto. Those of ordinary skill in the art may make various variations and improvements without departing from the spirit and essence of the present invention, and these variations and improvements shall also fall into the protection scope of the present invention.

The invention claimed is:

1. A backlight module, comprising a light guide plate, a collimated light source and a shading plate between the light guide plate and the collimated light source, wherein
    the light guide plate comprises a transparent main body and a plurality of diffusion dots formed on the transparent main body;
    the shading plate comprises a plurality of shading regions formed by a plurality of shading patterns on a transparent substrate corresponding to the plurality of diffusion dots of the light guide plate; wherein each of the plurality of diffusion dots are of a size with or smaller than a corresponding shading region of the plurality of shading regions, and light transmission regions exist between the shading regions; and
    the collimated light source is arranged below and all across the shading plate and generates collimated light vertically irradiating on the shading plate, such that the light is vertically incident on the light transmission regions.

2. The backlight module according to claim 1, wherein the shading plate comprises:

the transparent substrate; and the plurality of shading patterns on the transparent substrate that form the plurality of shading regions.

3. The backlight module according to claim 1, wherein the light guide plate comprises collimated light exiting regions between adjacent diffusion dots, and a size of the collimated light exiting region is equal to a size of the shading region of the shading plate.

4. The backlight module according to claim 1, wherein the collimated light source comprises a laser.

5. The backlight module according to claim 1, wherein the collimated light source comprises a LED lamp with a collimating lens.

6. The backlight module according to claim 1, wherein a material of the transparent main body of the light guide plate is one of polycarbonate, polymethyl methacrylate and glass.

7. A display device, comprising the backlight module according to claim 1.

8. The backlight module according to claim 2, wherein a material of the shading pattern is metal.

9. The backlight module according to claim 2, wherein a material of the shading pattern is glass.

10. A display device, comprising the backlight module according to claim 2.

11. A display device, comprising the backlight module according to claim 8.

12. A display device, comprising the backlight module according to claim 9.

13. A display device, comprising the backlight module according to claim 3.

14. A display device, comprising the backlight module according to claim 4.

15. A display device, comprising the backlight module according to claim 5.

16. A display device, comprising the backlight module according to claim 6.

17. A method for operating a backlight module, the backlight module comprising a light guide plate, a collimated light source and a shading plate between the light guide plate and the collimated light source, wherein the light guide plate comprises a transparent main body and a plurality of diffusion dots formed on the transparent main body, the shading plate comprises a plurality of shading regions formed by patterns on a transparent substrate corresponding to the plurality of diffusion dots of the light guide plate, wherein each of the plurality of diffusion dots are of a size with or smaller than a corresponding shading region of the plurality of shading regions, and light transmission regions exist between the shading regions, and the collimated light source is arranged below and all across the shading plate and generates collimated light vertically irradiating on the shading plate, such that the light is vertically incident on the light transmission regions, and the method comprises:

in an anti-peep display mode, aligning the shading regions of the shading plate with the diffusion dots of the light guide plate in a direction perpendicular to a plane of the backlight module; and in a normal display mode, staggering the shading regions of the shading plate with the diffusion dots of the light guide plate in the direction perpendicular to the plane of the backlight module.

18. The method for operating a backlight module according to claim 17, wherein the backlight module further comprises a driving unit connected to at least one of the shading plate and the light guide plate, and the method comprises:

in the anti-peep display mode, driving, by the driving unit, the at least one of the shading plate and the light guide plate to move such that the shading regions of the shading plate are aligned with the diffusion dots of the light guide plate in the direction perpendicular to the plane of the backlight module; and in the normal display mode, driving, by the driving unit, the at least one of the shading plate and the light guide plate to move such that the shading regions of the shading plate are staggered with the diffusion dots of the light guide plate in the direction perpendicular to the plane of the backlight module.

* * * * *